United States Patent [19]

Tokarski et al.

[11] Patent Number: 4,991,042
[45] Date of Patent: Feb. 5, 1991

[54] DIGITAL CIRCUIT INTERRUPTER WITH KEYPAD DATA ENTRY AND DISPLAY

[75] Inventors: Cheryl M. Tokarski, Cheshire; Robert J. Danek, Andover, both of Conn.

[73] Assignee: General Electric Company, New York, N.Y.

[21] Appl. No.: 495,666

[22] Filed: Mar. 19, 1990

[51] Int. Cl.⁵ .............................................. H02H 3/04
[52] U.S. Cl. ........................................ 361/93; 361/96; 340/664
[58] Field of Search ...................... 361/93, 96; 340/664

[56] References Cited

U.S. PATENT DOCUMENTS

| | | | |
|---|---|---|---|
| 4,589,052 | 5/1986 | Dougherty | 361/94 |
| 4,672,501 | 6/1987 | Bilac et al. | 361/96 |
| 4,728,914 | 3/1988 | Morris et al. | 335/6 |
| 4,751,605 | 6/1988 | Mertz et al. | 361/91 |
| 4,754,247 | 6/1988 | Raymont et al. | 335/202 |
| 4,780,787 | 10/1988 | Dano et al. | 361/93 |
| 4,814,712 | 3/1989 | Burton et al. | 324/424 |
| 4,827,369 | 5/1989 | Saletta et al. | 361/93 |
| 4,870,531 | 9/1989 | Danek | 361/93 |
| 4,945,443 | 7/1990 | DeBioski et al. | 361/93 |

Primary Examiner—Todd E. Deboer
Attorney, Agent, or Firm—Richard A. Menelly; Walter C. Bernkopf; Fred Jacob

[57] ABSTRACT

A circuit breaker containing an electronic trip unit utilizes a digital keypad and display to enter and display the trip parameters. The trip parameters are determined by means of a setpoint value that is incremented by means of an algorithm whenever the trip parameters are changed.

10 Claims, 7 Drawing Sheets

DIGITAL CIRCUIT INTERRUPTER WITH KEYPAD DATA ENTRY AND DISPLAY

BACKGROUND OF THE INVENTION

This invention relates to solid state circuit interrupters employing digital electronic trip units. One such solid state circuit interrupter is described within U.S. Pat. No. 4,589,052, which Patent is incorporated herein for purposes of reference. Such electronic trip units are used in circuit interrupters and are capable of acting on a number of programmed setpoint trip parameters to interrupt the circuit being protected in a timely manner. One such electronic trip unit which allows for user interaction and which provides capability both to select trip parameters and to view the selected trip parameters is found within U.S. Pat. No. 4,672,501, which Patent is also incorporated herein for purposes of reference.

For purposes of reducing cost while maintaining accuracy and functionality of the electronic trip units, microprocessors are being employed to gather information, process the information, and provide a means of monitoring the information using associated digital circuitry. The use of such microprocessors allows more protection functions to be contained in smaller-sized packages. Smaller-sized circuit interrupters because of limited space requirements do not contain the means required to enter data or to view the data being processed. The user-interfaces employed on larger-sized molded case circuit interrupters typically consist of rotatable switches with associated printed indicia to indicate the relative switch positions. The amount of area available on the front panel of such circuit interrupters is also limited and hence reduces the number of optional features requiring such switches.

A separate portable display and keypad in the form of a self-contained unit, powered by an internal power supply, which contains a microprocessor and associated circuitry and which communicates with the circuit interrupter trip unit using an infrared transmitter is described within U.S. Pat. No. 4,751,605. This arrangement requires a separate microprocessor and related digital circuitry within the portable display and keypad which adds to the overall cost of the circuit interrupter.

U.S. Pat. No. 4,814,712 describes a separate portable display and keyboard unit that is capable of reading stored setpoints within an associated circuit interrupter but is incapable of changing the setpoint parameters.

U.S. Pat. No. 4,870,531 entitled "Circuit Breaker with Removable Display and Keypad", which Patent is incorporated herein for reference purposes, describes a user-interface unit that contains display capability for all possible circuit interrupter options by means of software located solely within the trip unit microprocessor while only displaying those parameters for which the electronic trip unit is configured.

Prior art digital circuit interrupters used within industrial power distribution circuits generally employ a "look-up" table in combination with the trip unit microprocessor to store and display the many trip parameters utilized by the circuit interrupters within a wide variety of industrial power circuit applications. The use of a look-up table to store trip parameters within an electronic trip unit requires correspondingly large memory capacity to store the large number of possible settings for each setpoint. With circuit breakers employing a keypad and display unit such as described within the aforementioned U.S. Pat. No. 4,870,531 it is economically infeasible to utilize expensive memory chips to store the setpoint data.

Accordingly, one purpose of the instant invention is to provide a digital circuit interrupter used within industrial power distribution circuits that is capable of providing a wide variety of trip parameters without requiring a correspondingly large data storage capacity.

SUMMARY OF THE INVENTION

A circuit breaker containing an electronic trip unit utilizes a digital keypad and display to enter and display the setpoint trip parameters. The trip parameters are determined by means of a setpoint value that is incremented by means of an algorithm to change the trip parameters. The setpoints can be selectively displayed and augmented prior to incorporating within the trip unit.

DESCRIPTION OF THE PREFERRED EMBODIMENT

Figure 1:
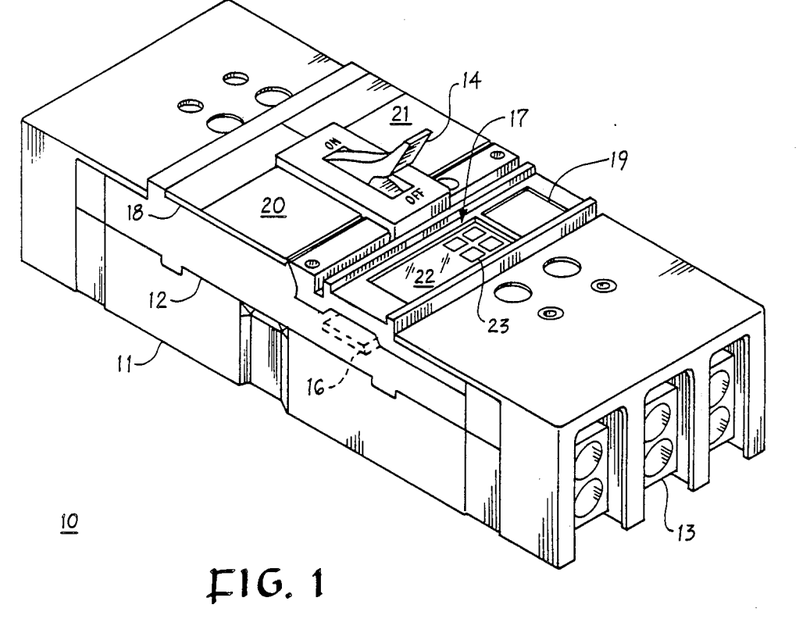
FIG. 1 is a top perspective view of the circuit breaker with keypad entry and display according to the invention.
Figure 2:
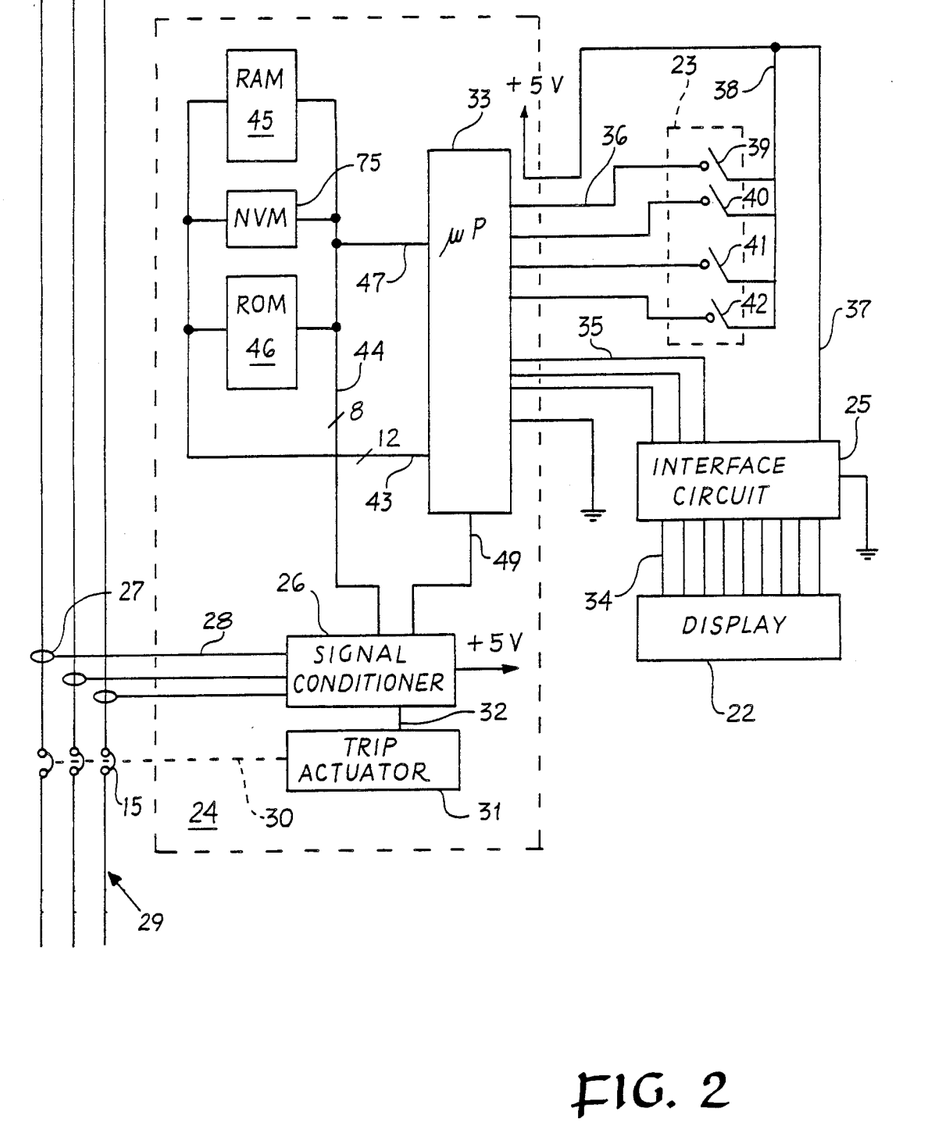
FIG. 2 is a schematic representation of the circuit contained within the circuit breaker of FIG. 1.
Figure 3:
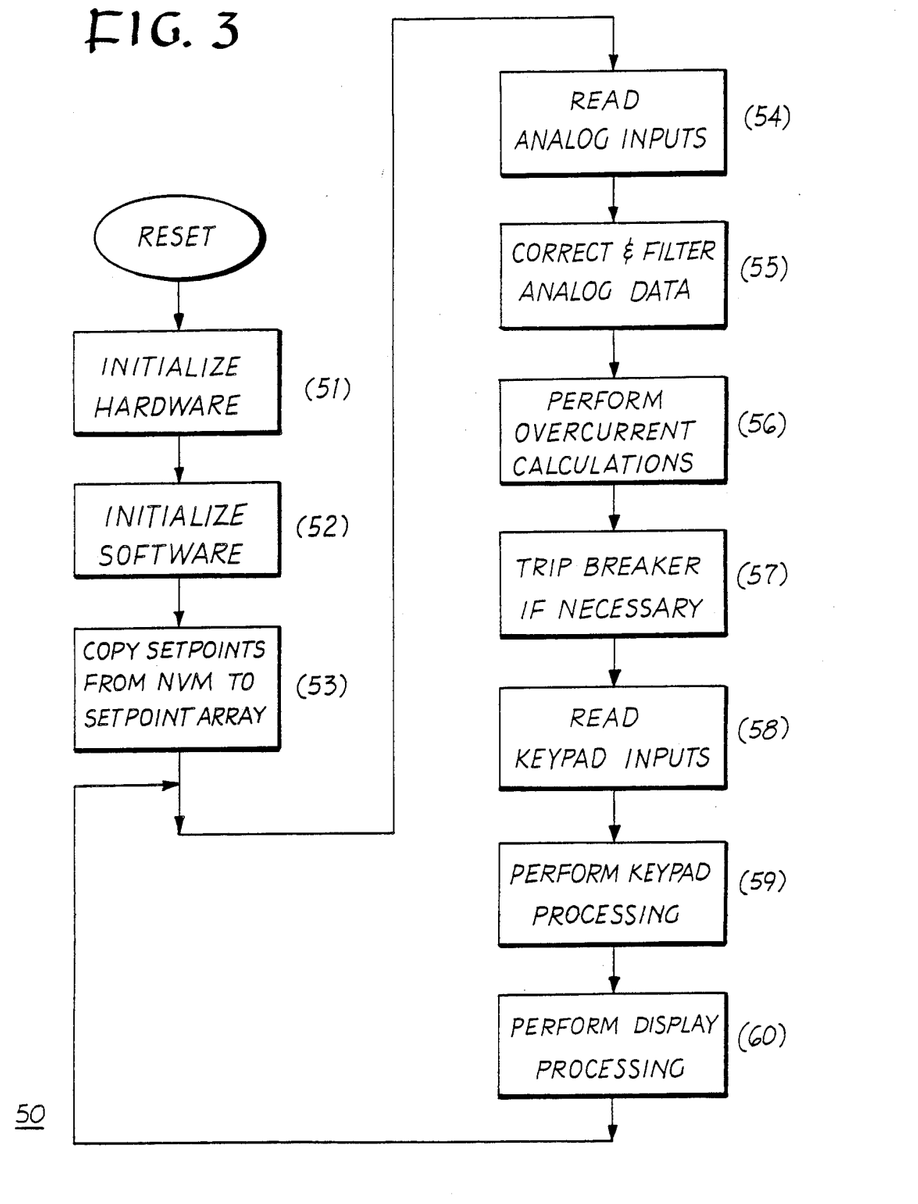
FIG. 3 is a flow chart representation of the initialization and processing operation of the trip unit circuit contained within the circuit of FIG. 2.

A circuit breaker employing an electronic trip unit, hereafter "digital circuit interrupter" is depicted at 10, in FIG. 1. The digital circuit interrupter includes an interrupter case 11 closed by an interrupter cover 12 and electrical connection is made with the circuit interrupter by means of the load terminals 13 at one end and through corresponding line terminals at an opposite end (not shown). An operating handle 14 provides manual intervention to open the circuit breaker contacts 15 (FIG. 2) which are otherwise automatically controlled by means of an electronic trip unit 16 which trip unit is contained within the interrupter cover. A separate accessory cover 18 is attached to the interrupter cover and includes a recess for receiving the keypad and display unit 17 and a separate recess for receiving the rating plug 19. A good description of the function of the accessory cover is found within U.S. Pat. No. 4,754,247 and the rating plug is described within U.S. Pat. No. 4,728,914. The accessory cover includes two accessory doors 20, 21 which provide access to at least one accessory and to the trip actuator unit contained within the interrupter cover as described within aforementioned U.S. Pat. No. 4,754,247. The keypad and display unit 17 comprises a display 22 and a keypad 23 which interconnect with the trip unit. The trip unit circuit 24 within the trip unit is similar to that described within aforementioned U.S. Pat. No. 4,870,531 and is shown in FIG. 2 wherein the ROM 46, which contains the operational program for the microprocessor 33, connects with the microprocessor over buses 43, 47 and wherein the RAM 45 and NVM 75 which contain the data processed within the microprocessor also connect with the microprocessor over bus conductors 43, 47. The trip unit circuit interconnects with a three-phase industrial power circuit generally shown at 29 by means of three current transformers 27, signal conditioner circuit 26, corresponding conductors 28 and bus conductors 44, 49. The signal conditioner circuit 26 generates both the 5 volt operating power and the analog to digital conversion of the current through conductors 29. Upon the occurrence of an overcurrent condition for a predetermined period of time, a trip signal is communicated to the signal conditioner circuit 26 over bus conductor 49 by the microprocessor. The trip signal is output over conductor 32 from the signal conditioner 26 to the trip actuator 31 which operably connects with the contacts 15 by means of conductor 30. As described within aforementioned U.S. Pat. No. 4,870,531, an interface circuit 25 interconnects between the display 22 by means of conductors 34. Power is provided to the interface circuit 25 and keypad 23 by means of conductors 37, 38. The keypad connects with the microprocessor over conductors 36 and the interface circuit connects with the microprocessor over conductors 35 as indicated. The keypad includes four switches (39–42) which operate as the "FUNCTION", "VALUE", "SELECT" and "ENTER" (F, V, S, E) keys. Each of the keys provides a logic level to the microprocessor in the event the key is closed. The software operating in the microprocessor senses the logic level of each key and determines operation of the display in a manner to be described below.

Figure 4:
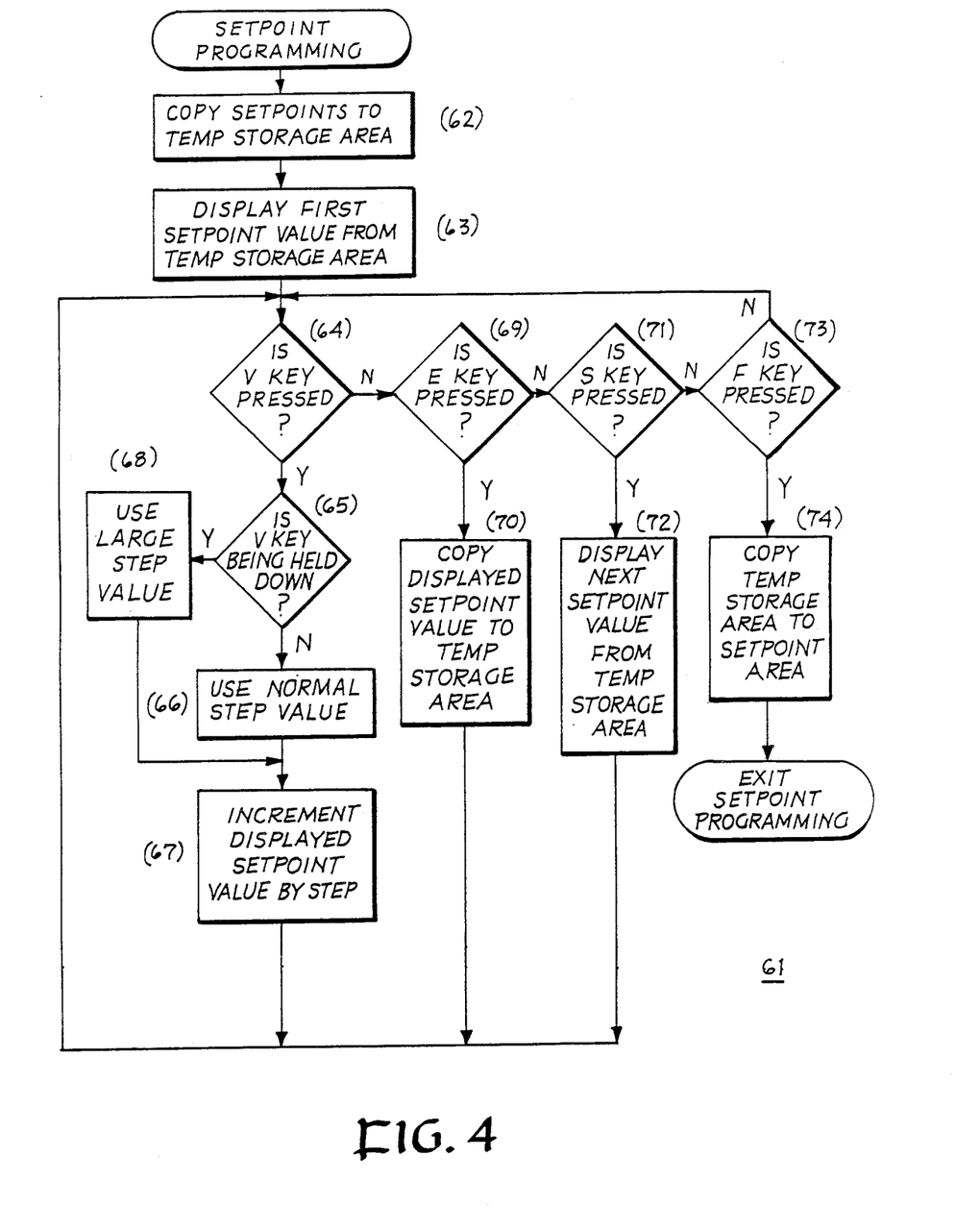
FIG. 4 is a flow chart representation of the setpoint processing operation of the circuit of FIG. 2.

The operation of the interface circuit 25 and trip unit circuit 24 is best seen by referring now to FIGS. 3–6 which contain the operating programs for generating the setpoints used within the microprocessor to interrupt the circuit current. The initialization and processing operation 50 of FIG. 3 operates by first initializing the microprocessor (51) and the associated software contained within ROM, RAM and NVM (52). Next the setpoints contained within the NVM are copied to the setpoint array contained within the RAM (53). The analog inputs from the signal conditioner circuit are read (54) corrected and filtered (55). At this time, the microprocessor performs the overcurrent calculations (56) and the trip actuator is energized (57) if an overcurrent condition exists at this time. The switches within the keypad unit are read (58) and the keypad processing (59) and the display processing (60) are now performed. Once the display processing function is complete, steps 54–60 are continuously repeated as long as the trip unit circuit remains energized. The setpoint processing operation 61 is shown in FIG. 4 wherein this processing is entered or exited when the user presses the FUNCTION key. Upon the start of the setpoint processing, the setpoints used for the overcurrent calculations are copied from the SETPOINT ARRAY in the RAM to the TEMP ARRAY (62). The first setpoint value from this TEMP ARRAY is shown on the display (63). If the VALUE key is pressed (64), an increment, determined by the amount of time that the VALUE key is pressed, is added to the displayed setpoint (65). A large increment is used if the VALUE key is held down (68) and a small increment is used if the VALUE key is pressed and released (66). The newly incremented setpoint is then displayed (67), thereby using an algorithm to change the setpoint. If the ENTER key is pressed (69) the displayed setpoint is recorded in the TEMP ARRAY in the RAM (70). If the SELECT key is pressed (71), the next setpoint from the TEMP ARRAY is selected and displayed (72), and the previously displayed value was either entered in the TEMP ARRAY or not entered. When the FUNCTION key is pressed (73), the TEMP ARRAY is copied into the SETPOINT ARRAY (74) thereby loading any new setpoint values into the SETPOINT ARRAY for use by the overcurrent calculations and the new setpoint values are saved in the NVM.

An operator is thereby able to inspect the operational setpoints that are currently used by the microprocessor to determine overcurrent conditions by displaying the setpoints. If it is desired to change a displayed setpoint, the VALUE key is pressed and either a "large" increment is added to the displayed value or a "normal" increment is added to the displayed value. Pressing the ENTER key stores the selected setpoint and pressing the SELECT key displays the next set point. Pressing the FUNCTION key converts the non-operational setpoints to operational setpoints which are then stored in the RAM and NVM and used by the microprocessor for overcurrent determination.

Figure 5:
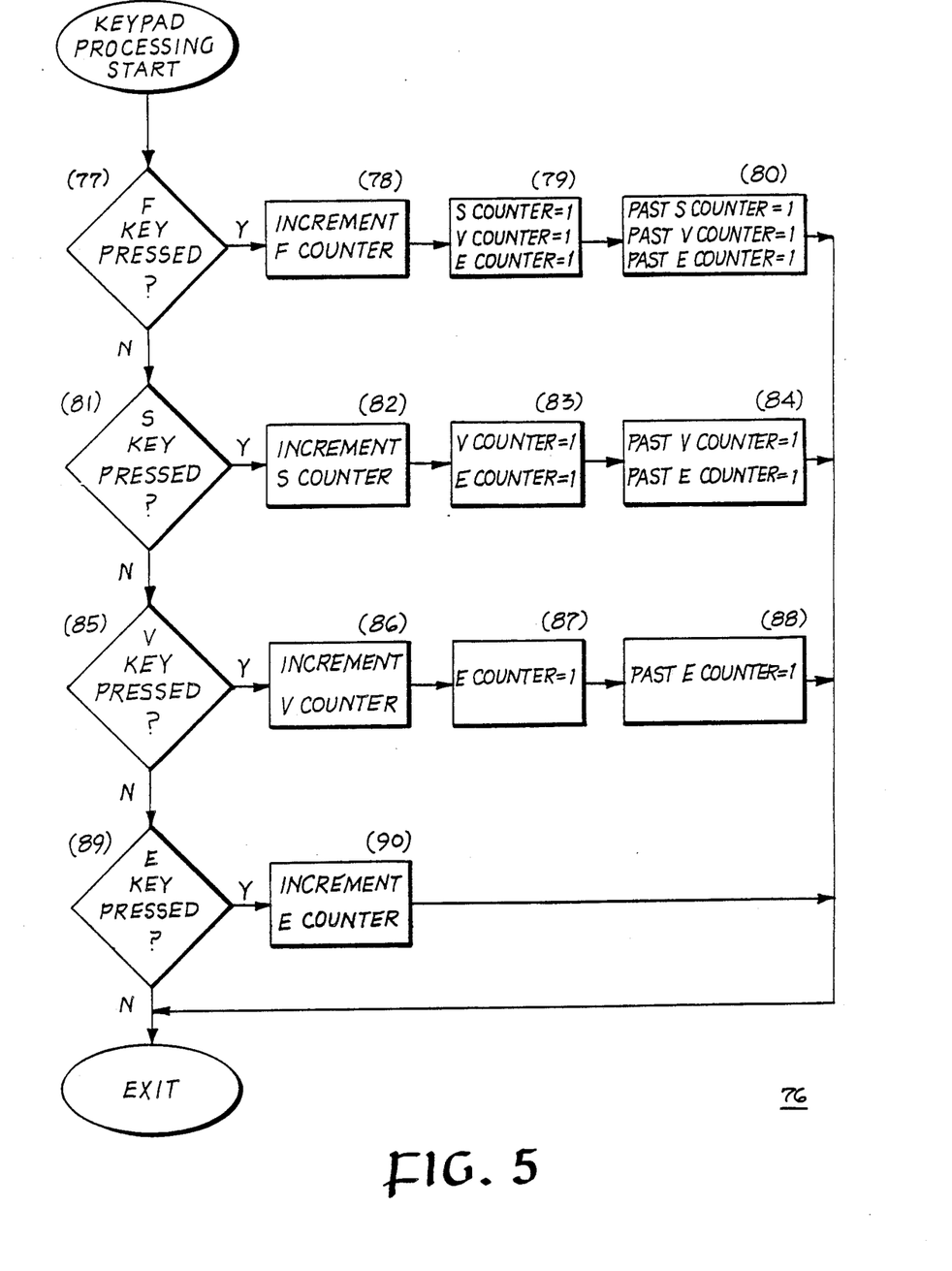
FIG. 5 is a flow chart representation of the keypad processing of the circuit of FIG. 2.
Figure 6A:
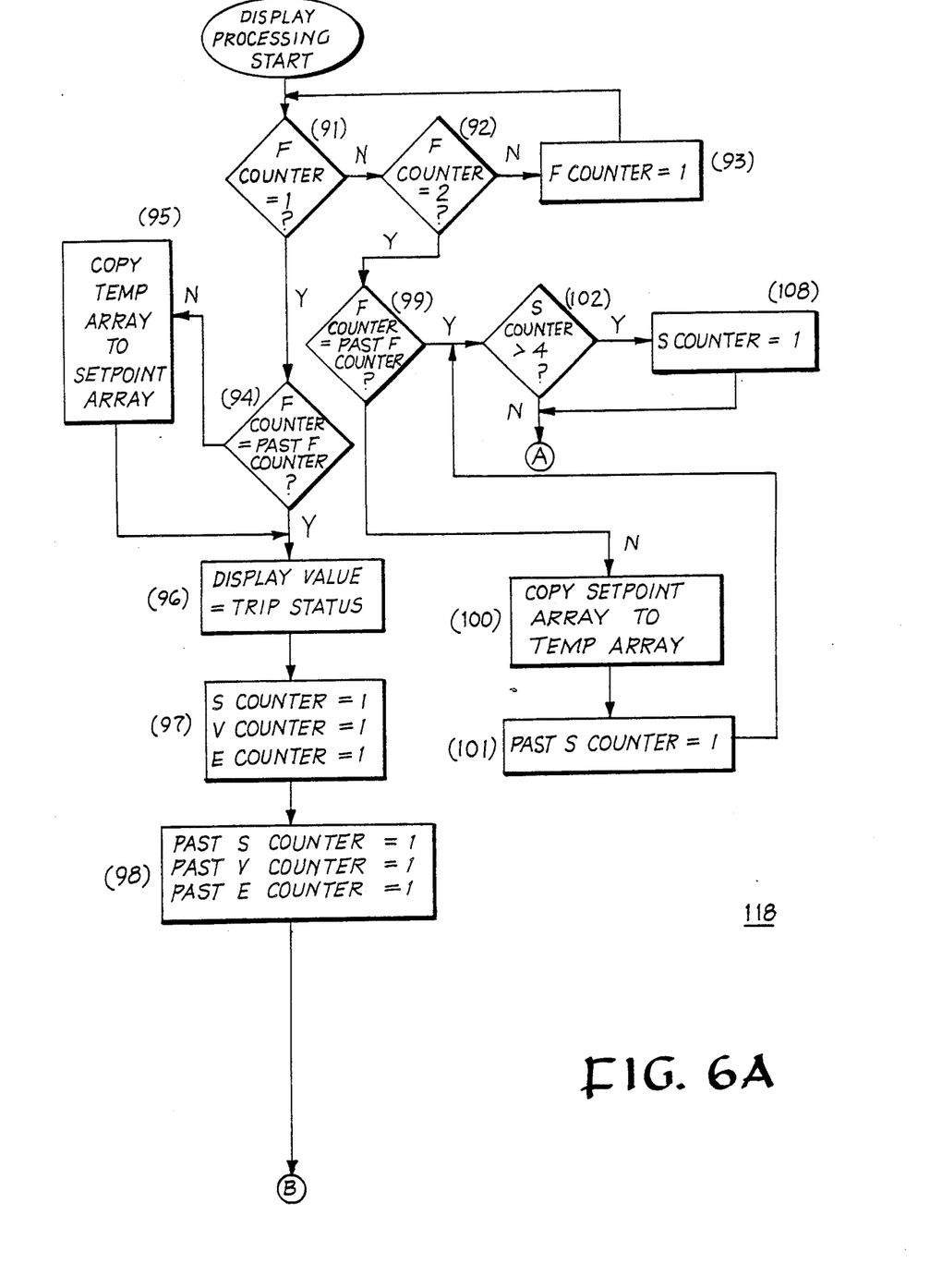
FIGS. 6A and 6B depict a flow chart representation of the operation of the display processing of the circuit of FIG. 2.
Figure 6B:
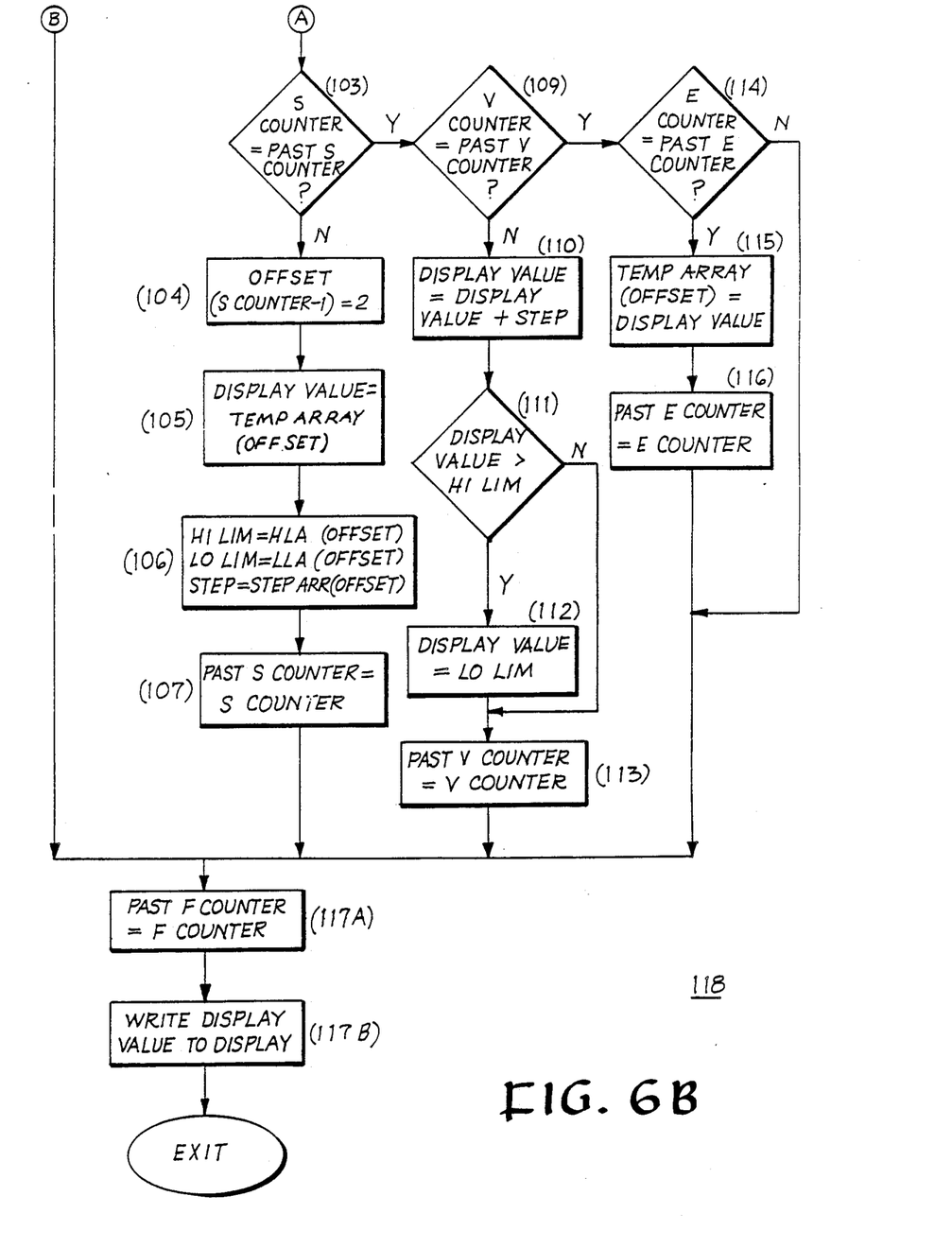

The detailed keypad processing operation 76 is depicted in FIG. 5 and the detailed display processing operation 118 is depicted in FIGS. 6A, 6B. The keypad processing of FIG. 5 operates as follows. Upon software initialization the values of 8 counters in the microprocessor are set to "one". There is a counter in the microprocessor for each of the four keys on the keypad (F, V, S, E COUNTERS), and one counter for each of the last states of the key counters. When a key is pressed, the software determines which of the keys is pressed and increments the associated counter for that key and sets the past values as shown in FIG. 5. When the FUNCTION key is pressed (77), the F COUNTER is incremented (78), the SELECT, VALUE and ENTER COUNTERS are set equal to "one" (79), and the PAST SELECT, VALUE and ENTER COUNTERS are set equal to "one" (80). If the function key is not pressed, a determination is made as to whether the SELECT key is pressed (81) and if so, the S COUNTER is incremented (82), the VALUE and ENTER COUNTERS are set equal to "one" (83) and the PAST VALUE and PAST ENTER COUNTERS are set equal to "one" (84). If the STATUS key is not pressed, a determination is made as to whether the VALUE key is pressed (85) and if so, the V COUNTER is incremented (86), the ENTER COUNTER is set equal to "one" (87) and the PAST ENTER COUNTER is set equal to "one" (88). If the VALUE key is not pressed a determination is made as to whether the ENTER key is pressed (89) and if so, the ENTER COUNTER is incremented (90). If the ENTER key is not pressed, the processing is concluded.

In performing the display processing operation 118, shown in FIGS. 6A and 6B, the previously described counters for each of the keys are used to determine what is shown on the display. The value of the F COUNTER determines whether the status of the breaker contacts are shown on the display (F COUNTER=1) or the setpoint values are shown on the display (F COUNTER=2). Upon entry into the display processing (118), the value of F COUNTER is tested (91). If the F COUNTER equals "one", to display trip status, then a determination is made as to whether the F COUNTER differs from the PAST F COUNTER (94) indicating the FUNCTION key was pressed since the last time through the display processing. If it does, the TEMP ARRAY is copied to the SETPOINT ARRAY (95) saving the new setpoints. If the F COUNTER equals the PAST F COUNTER (94), this indicates that the FUNCTION key has not been pressed since the last time through the display processing. In both events, the current value of the trip status is shown on the display (96) and the remaining key counters are all set equal to "one" (97). The past values of the key counters are also set equal to "one" and the trip status is displayed (98). If the F COUNTER equals "two" the setpoints are displayed using the S, V and E COUNTERS to determine which setpoint to display, and whether or not to increment or save the displayed setpoints. A determination is made as to whether the F COUNTER equals the PAST F COUNTER (99) indicating the first time through the setpoint processing since the Function key was pressed. If the COUNTERS are equal, the SETPOINT ARRAY is copied to the TEMP ARRAY (100) and the PAST S COUNTER is set equal to "one" (101). Whether the F COUNTER and PAST F COUNTER were equal or not, a determination is made as to whether the S COUNTER is greater than "four" (102), the maximum allowed value. If so, then the S COUNTER is set equal to "one" (108) and a determination is made as to whether the S COUNTER differs from the PAST S COUNTER (103) indicating that the SELECT key was pressed since the last time through the display processing, and the need to display a new setpoint value from the TEMP ARRAY. If the SELECT key has been pressed, an offset value is determined from the value of the S COUNTER (104) to get the next setpoint value from the TEMP ARRAY (105) in the RAM. This offset is also used to get high and low limit values, and an increment for the new displayed setpoint from arrays stored in ROM. The high limit is obtained from the HIGH LIMIT ARRAY the low limit is obtained from the LOW LIMIT ARRAY and the step value from the STEP ARRAY (106). The PAST S COUNTER is set equal to the S COUNTER (107), the PAST F COUNTER is set equal to the F COUNTER (117A) and the new setpoint value is displayed (117B). If the S COUNTER is equal to the PAST S COUNTER which signifies that the SELECT key was not pressed, a determination is made as to whether the V COUNTER is equal to the PAST V COUNTER (109) indicating that the VALUE key was pressed and requesting the next value for the displayed setpoint. If the V COUNTER is not equal to the past V COUNTER, the display value is set equal to the display value plus an increment (110) and a determination is made as to whether the display value exceeds the high limit (111). If so, the display value is set equal to the low limit (112), the PAST V COUNTER is then set equal to the V COUNTER (113), the PAST F COUNTER is set equal to the F COUNTER (117A) and the new display value is displayed (117B). If the V COUNTER equals the PAST V COUNTER, a determination is made as to whether the E COUNTER equals the PAST E COUNTER (114) which signifies whether the ENTER key was pressed. If the ENTER key was pressed, the displayed setpoint value is stored in the TEMP ARRAY (115) and the PAST E COUNTER is then set equal to the E COUNTER (116). If none of the keys have been pressed since the last time the display processing function was executed, no action on the displayed value is performed. This provides a real time system which allows the user to view and to change setpoint values, while continuously providing protection functions.

It has herein been shown that a single keypad and display with limited nonvolatile memory can be used in combination with a microprocessor and associated ROM and RAM memory devices, to enter, display and change setpoints over a wide range of operating values in real time without interfering with the protection of an associated electrical power distribution system.

Having thus described our invention, what we claim as new and desire to secure by Letters Patent is:

1. An electronic circuit interrupter comprising:
   a molded plastic interrupter case and a molded plastic interrupter cover;
   a pair of separable contacts within said interrupter case arranged to automatically separate upon occurrence of an overcurrent condition through said contacts;
   an electronic trip unit within said interrupter cover and arranged for electrical connection with an associated electric power distribution circuit, said electronic trip unit including a microprocessor;
   a keypad and display unit within a recess formed within said interrupter cover, said keypad and display unit being connected with said trip unit to input operational setpoints to said microprocessor, said operational setpoints determining said automatic separation;
   a ROM connected with said microprocessor storing operating programs for said microprocessor;
   a RAM connected with said microprocessor storing said operational setpoints controlling said automatic separation of said contacts; and
   an NVM connected with said microprocessor storing setpoint values, said setpoint values being displayed and augmented without effecting said automatic contact separation.

2. The circuit interrupter of claim 1 wherein said ROM further includes a setpoint processing algorithm incrementing and decrementing non-operational setpoint values stored in said RAM to provide non-operational set points said non-operational setpoints not effecting said automatic contact separation.

3. The circuit interrupter of claim 1 wherein said keypad comprises a SELECT key, a VALUE key, an ENTER key and a FUNCTION key, each of said keys connecting with said microprocessor through a corresponding ON-OFF switch.

4. The circuit interrupter of claim 3 including an accessory cover attached to said interrupter cover, said accessory cover including a slot circumferentially surrounding said keypad and display unit.

5. The circuit interrupter of claim 2 wherein said non-operational and said operational setpoint values are arranged in an array format.

6. The circuit interrupter of claim 3 wherein actuation of said FUNCTION key causes said operational setpoints from said RAM to be displayed as non-operational setpoints.

7. The circuit interrupter of claim 6 wherein actuation of said ENTER key followed by said FUNCTION key further selectively converts said displayed non-operational setpoints to operational setpoints and stores said selected operational setpoints in said RAM and said NVM.

8. The circuit interrupter of claim 3 wherein actuation of said VALUE key initiates said algorithm to generate non-operational setpoints from said non-operational setpoint values.

9. The circuit interrupter of claim 9 wherein combination of actuating said ENTER key followed by said FUNCTION key converts said non-operational setpoints to said operational setpoints and stores said converted operational setpoints to said RAM for use by said microprocessor in determining said automatic separation of said contacts.

10. The circuit interrupter of claim 5 wherein said operational setpoints are transferred from said NVM to said RAM in said array format upon application of power to said microprocessor.

* * * * *